US012664410B2

(12) United States Patent
Wang et al.

(10) Patent No.: US 12,664,410 B2
(45) Date of Patent: Jun. 23, 2026

(54) METHODS AND DEVICES FOR ACCELERATING A TRANSFORMER WITH A SPARSE ATTENTION PATTERN

(71) Applicant: KWAI INC., Palo Alto, CA (US)

(72) Inventors: Zhendong Wang, Plano, TX (US); Yongxiong Ren, San Jose, CA (US); Yang Liu, San Jose, CA (US); Lingzhi Liu, San Jose, CA (US)

(73) Assignee: BEIJING TRANSTREAMS TECHNOLOGY CO. LTD. search, Beijing (CN)

( * ) Notice: Subject to any disclaimer, the term of this patent is extended or adjusted under 35 U.S.C. 154(b) by 1274 days.

(21) Appl. No.: 17/513,838

(22) Filed: Oct. 28, 2021

(65) Prior Publication Data

US 2023/0133305 A1      May 4, 2023

(51) Int. Cl.
*G06N 3/063* (2023.01)
*G06F 17/16* (2006.01)
*G06N 3/0495* (2023.01)

(52) U.S. Cl.
CPC ............. *G06N 3/063* (2013.01); *G06F 17/16* (2013.01); *G06N 3/0495* (2023.01)

(58) Field of Classification Search
None
See application file for complete search history.

(56) References Cited

U.S. PATENT DOCUMENTS

| | | | |
|---|---|---|---|
| 11,562,734 B2 | 1/2023 | Ren et al. | |
| 11,830,480 B2 | 11/2023 | Ren et al. | |
| 2019/0042542 A1* | 2/2019 | Narayanamoorthy | .. G06F 17/16 |
| 2022/0310068 A1 | 9/2022 | Ren et al. | |
| 2023/0041163 A1* | 2/2023 | Elsen | ...................... G06F 17/16 |

FOREIGN PATENT DOCUMENTS

CN          113901747 A  *  1/2022  ........... G06F 30/331

OTHER PUBLICATIONS

Takuma Yamaguchi and Federico Busato, "Accelerating Matrix Multiplication with Block Sparse Format and NVidia Tensor Cores", Mar. 19, 2021, NVidia, web (Year: 2021).*

(Continued)

*Primary Examiner* — Kakali Chaki
*Assistant Examiner* — Tyler Edward Iles
(74) *Attorney, Agent, or Firm* — Arch & Lake LLP; Hao Tan; Shen Wang

(57) ABSTRACT
A method and an apparatus for accelerating a transformer with a sparse attention pattern are provided. The method includes that a heterogeneous device including one or more GPUs loads a first matrix, a second matrix, and a transformed sparsity mask into a first sampled dense-dense matrix multiplication (SDDMM) kernel in a sparse attention module in the transformer and generates a first output based on the first matrix, the second matrix, and the transformed sparsity mask by the first SDDMM kernel, generates a second output by a softmax kernel in the sparse attention module based on the first output, loads the second output, a third matrix, and the transformed sparsity mask into a matrix multiplication kernel in the sparse attention module, and generates an output of the sparse attention module.

18 Claims, 3 Drawing Sheets

(56)                       References Cited

OTHER PUBLICATIONS

NVidia Corp, "cuSPARSE Library" (v11.4), Jun. 2021, NVidia, web (Year: 2021).*

Lu, Liqiang et al. "Sanger: A Co-Design Framework for Enabling Sparse Attention Using Reconfigurable Architecture.", Oct. 24, 2021, ACM, pp. 977-991, (Year: 2021).*

Ashish Vaswani, et al., "Attention Is All You Need", arXiv:1706. 03762, arXiv:1706.03762v7 [cs.CL] Aug. 2, 2023 (15p).

Iz Beltagy, et al., "Longformer: The Long-Document Transformer", arXiv:2004.05150v2 [cs.CL] Dec. 2, 2020, (17p).

Qipeng Guo, et al., "Star-Transformer", arXiv:1902.09113v3 [cs. CL] Apr. 24, 2022, (11p).

Krzysztof Choromanski, et al., "Rethinking Attention with Performers", arXiv:2009.14794v4 [cs.LG] Nov. 19, 2022, (38p).

Han Shi et al., "SparseBERT: Rethinking the Importance Analysis in Self-attention", arXiv:2102.12871v3 [cs.LG] Jul. 1, 2021, (15p).

NVidia cuSPARSE provides SDDMM ( ) and SpMM ( ) implementation API, DU-06709-001_v12.0, Dec. 2022, (310p).

Hong, Changwan, et al. "Adaptive sparse tiling for sparse matrix multiplication." Proceedings of the 24th Symposium on Principles and Practice of Parallel Programming. 2019. (15p).

* cited by examiner

A

Scale

Softmax

Softmax <u>205</u>

B

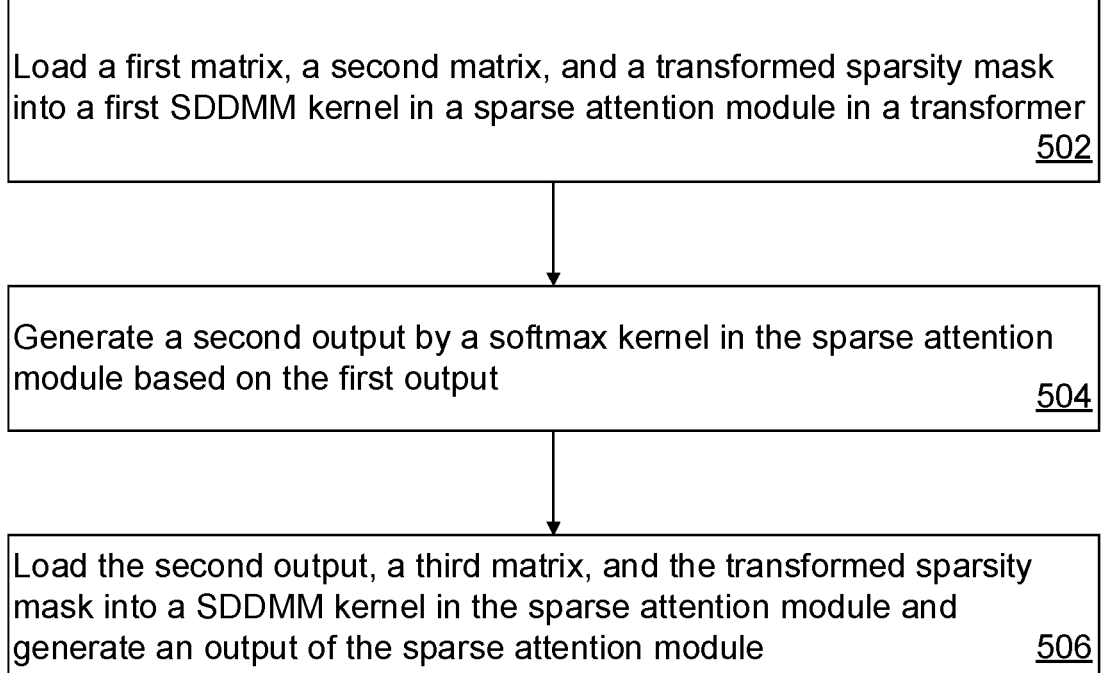

Load a first matrix, a second matrix, and a transformed sparsity mask into a first SDDMM kernel in a sparse attention module in a transformer <u>502</u>

Generate a second output by a softmax kernel in the sparse attention module based on the first output <u>504</u>

Load the second output, a third matrix, and the transformed sparsity mask into a SDDMM kernel in the sparse attention module and generate an output of the sparse attention module <u>506</u>

FIG. 5

METHODS AND DEVICES FOR ACCELERATING A TRANSFORMER WITH A SPARSE ATTENTION PATTERN

FIELD

The present application generally relates to accelerating a transformer neural network, and in particular but not limited to, accelerating sparse attention calculation in an attention module of the transformer neural network.

BACKGROUND

Transformer neural networks, i.e., transformers, are popular sequence modeling architectures, which have been widely used in many tasks such as machine translation, language modeling, and image generation and objective detection. A transformer neural network can take an input in the form of a sequence of vectors, and converts it into a vector called an encoding, and then decodes it back into another sequence. Transformers can outperform the previously de facto sequence modeling choice, i.e., recurrent neural networks (RNNs), and conventional convolutional neural network (CNN) based models.

RNNs have a fundamentally different design from transformers. An RNN processes the input words one by one and maintains a hidden state vector over time. Every input is passed through several layers of the neural network and modifies the state vector. Theoretically, the state vector, at a given time, could retain information about inputs from far in the past. However, the hidden state of the model usually conserves little usable information about early inputs. New inputs can easily overwrite a state, causing information loss. This means that the performance of an RNN tends to degrade over long sentences. This is called the long-term dependency problem.

By contrast, a transformer processes the entire input sequence at the same time and the attention mechanism allows each output word to draw from each input and hidden state. Because RNNs process the input sequence sequentially, it is hard to take advantage of high-performance computing such as Graphic Processing Units (GPUs). The transformer design, with its parallel processing and multi-head attention mechanisms, allows for much faster training and execution since the different input words can be processed simultaneously on a GPU.

A transformer model is made up of stacked layers, each of which contains a multi-head attention mechanism followed by a small fully-connected network. An attention mechanism used in the transformer model takes in a query matrix Q, a key matrix K, and a value matrix V and computes a weighted average of input values based on the similarity of Q and K, as shown below:

$$\text{Attention}\,(Q,\,K,\,V) = \text{softmax}\!\left(\frac{QK^T}{\sqrt{d_k}}\right)\!V$$

While the transformer model is powerful, its main issue is its efficiency bottleneck. Particularly, $QK^T$ computes the similarity of each token in the sequence with all other tokens, requiring computation and memory that grows quadratically with the sequence length n, i.e., $O(n^2)$. This would prevent its use in longer sequence scenarios, such as long-document generation, long audio speech recognition (ASR), and video or image generation. Thus, there is a need of a better transformer architecture with less complexity to efficiently accelerate the transformer model on hardware devices, e.g., GPUs.

SUMMARY

The present disclosure describes examples of techniques relating to accelerating calculation of attention with a sparse attention pattern in a transformer in CPU/GPU heterogenous devices.

According to a first aspect of the present disclosure, a method for accelerating a transformer with a sparse attention pattern in heterogeneous devices is provided. The method includes that a heterogeneous device that includes one or more graphic processing units loads a first matrix, a second matrix, and a transformed sparsity mask into a first sampled dense-dense matrix multiplication (SDDMM) kernel in a sparse attention module in the transformer and generates a first output based on the first matrix, the second matrix, and the transformed sparsity mask by the first SDDMM kernel.

Additionally, the method includes that the heterogeneous device generates a second output by a softmax kernel in the sparse attention module based on the first output, loads the second output, a third matrix, and the transformed sparsity mask into a matrix multiplication kernel in the sparse attention module, and generates an output of the sparse attention module.

According to a second aspect of the present disclosure, an apparatus for accelerating a transformer with a sparse attention pattern in heterogeneous devices is provided. The apparatus includes one or more processors and a memory configured to store instructions executable by the one or more processors.

Upon execution of the instructions, the one or more processors are configured to load a first matrix, a second matrix, and a transformed sparsity mask into a first SDDMM kernel in a sparse attention module in the transformer and generate a first output based on the first matrix, the second matrix, and the transformed sparsity mask by the first SDDMM kernel.

Furthermore, the one or more processors are configured to generate a second output by a softmax kernel in the sparse attention module based on the first output, load the second output, a third matrix, and the transformed sparsity mask into a matrix multiplication kernel in the sparse attention module and generate an output of the sparse attention module.

According to a third aspect of the present disclosure, a non-transitory computer readable storage medium including instructions stored therein is provided. Upon execution of the instructions by one or more processors, the instructions cause the one or more processors to perform acts including: loading a first matrix, a second matrix, and a transformed sparsity mask into a first SDDMM kernel in a sparse attention module in a transformer in heterogeneous devices and generating a first output based on the first matrix, the second matrix, and the transformed sparsity mask by the SDDMM kernel. Furthermore, the instructions cause the one or more processor to perform acts including generating a second output by a softmax kernel in the sparse attention module based on the first output, loading the second output, a third matrix, and the transformed sparsity mask into a matrix multiplication kernel in the sparse attention module, and generating an output of the sparse attention module.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 5 is a flowchart illustrating a method for accelerating a transformer with a sparse attention pattern in heterogeneous devices in accordance with an example of the present disclosure.

DETAILED DESCRIPTION

Figure 1:
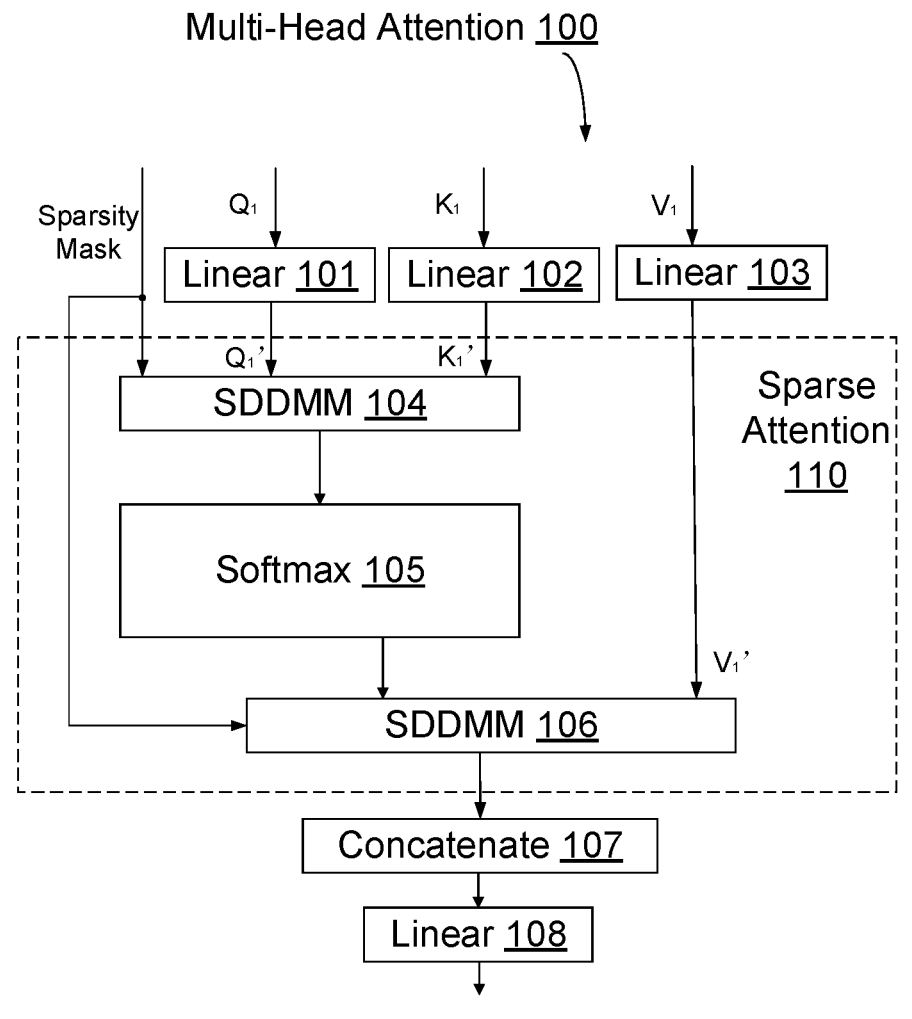
FIG. 1 is a block diagram illustrating a multi-head attention module in a transformer in accordance with an example of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g. devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure provides a general method to optimize and accelerate a sparse transformer model for a CPU/GPU heterogeneous platform. This general method can be easily and widely applied to different sparse transformer models regardless of specific sparsity patterns or masks. Thus, a general sparse attention module is proposed, and the general sparse attention module can be effectively accelerated if being deployed in the CPU/GPU heterogeneous platform. The computation speed of the CPU/GPU heterogeneous platform on which the general sparse attention module is deployed is therefore increased.

CPUs and GPUs are processing units. On a CPU, a kernel is executed repeatedly using different parameters. While a CPU tries to maximize the use of the processor by using two threads per core, a GPU tries to hide memory latency by using more threads per core. For example, the number of active threads per core on AMD hardware is 4 to up to 10, depending on the kernel code. A CPU/GPU heterogeneous platform may have multiple CPUs and multiple GPUs. A transformer may be implemented on a CPU/GPU heterogeneous platform.

For example, a transformer may have an encoder-decoder structure. The encoder of the transformer and the decoder of the transformer may be respectively implemented on different GPUs. Before loading to the encoder, audio, video, or image data may be pre-stored in a sever, a terminal, or storages in clouds. The server or the terminal may include an audio or image collector that collects the audio, video, or image data. The audio, video, or image collector may be a device independent from the server or the terminal and may communicate with the server or the terminal. The terminal may be, but not limited to, a computer, a laptop, a tablet, or a smart phone.

The server or the terminal then processes the audio, video, or image data collected from the audio, video, or image collector. For example, the terminal may extract a plurality of audio, video, or image feature sequences from the audio, video, or image data. Such processing of the audio, video, or image data may be implemented on CPUs for serial multi-thread computation. Each of the plurality of audio, video, or image feature sequences may include a plurality of frames. For example, the number of frames may be 5, 10, 15, or more. After the pre-processing of the audio, video, or image data, following computation may be parallelly performed on one or more GPUs.

The encoder of the transformer may include a plurality of stacked encoder layers that process the input iteratively one layer after another, each of which may include a multi-head attention layer and a position-wise fully connected feed-forward layer. A residual connection may be provided around each of the stacked multi-head attention layer and the position-wise fully connected feed-forward layer, followed by layer normalization/layer norm. Furthermore, before loading an encoder input into the encoder, the encoder input may be first fed into a process of encoder embedding. An output generated by the process of encoder embedding is then sent to an encoder layer.

In some examples, the process of encoder embedding may be implemented by an encoder embedding kernel which adds an input embedding and a positional embedding. The input embedding may be obtained by mapping one audio, video, or image feature sequence into an embedding vector based on a word embedding table. The positional embedding may be obtained based on a position within the audio, video, or image feature sequence.

In some examples, the encoder may include a plurality of encoder layers including encoder layer 1, encoder layer 2, . . ., encoder layer I, where I is a positive integer. An encoder input is fed into the process of encoder embedding first. An output generated by the process of encoder embedding is then sent to the encoder layer 1. An output of the first encoder layer 1 is then sent to the encoder layer 2. As such, each of the following encoder layers i receives an input from the previous encoder layer i−1 and sends respective output to the next encoder layer i+1, where i is an integer between 2 and I−1, including 2 and I−1. At last, the encoder layer I sends its output to a decoder.

Each encoder layer may include a plurality of modules including a multi-head attention module and a feed forward module. These modules may be implemented by processing circuities in a kernel-based machine learning system. For example, the multi-head attention module may be implemented by a multi-head attention mega kernel including a plurality of kernels, such as compute unified device architecture (CUDA) kernels that can be directly run on GPUs.

The multi-head attention module may implement a process of multi-head attention and the feed forward module may implement a process of feed forward. A residual connection together with layer norm are employed between each of the processes. Multi-head attention allows to jointly attend to information from different representation subspaces at different positions.

A decoder may include a plurality of stacked decoder layers. For example, the plurality of stacked decoder layers may include decoder layer 1, decoder layer 2, . . ., decoder layer J, where J may be a positive integer. A decoder input is fed into a process of decoder embedding first. A decoder embedding output generated by the process of decoder embedding is then sent to the decoder. Each decoder layer may include a plurality of modules including a multi-head attention module. The multi-head attention module in each decoder layer may be a multi-head self-attention module or a multi-head cross-attention module. These modules may be implemented by processing circuities in a kernel-based machine learning system. For example, the multi-head self-attention module may be implemented by a multi-head self-attention mega kernel including a plurality of kernels, such as CUDA kernels that can be directly run on GPUs. Further, the multi-head cross-attention module may be implemented by a multi-head cross-attention mega kernel including a plurality of kernels, such as CUDA kernels that can be directly run on GPUs. CUDA kernels enable parallel computing of multiple threads directly on GPUs, thus speeding up computing by harnessing the power of GPUs for the parallelizable part of the computation.

Further, according to some examples of the present disclosure, a sparse attention module in the transformer may include two SDDMM kernels which implement attention calculation. One SDDMM kernel may load a query matrix Q, a key matrix K, and a sparsity mask which may be transformed, and then generate a first output matrix. A softmax kernel in the transformer may then load the first output matrix and generate a second output matrix. The other SDDMM kernel may load the second output matrix, a value matrix V, and the sparsity mask, and generate an attention output for the spare attention module. The query matrix Q, the key matrix K, the value matrix V, and the second output matrix may be stored in a regular dense matrix format. The sparsity mask and the first output matrix may be stored in a compressed format, such as a compressed row storage (CRS) format, so as to save storage. As a result, the entire sparse attention module is well wrapped and can be easily applied to different sparsity transformer model regardless of the specific sparsity patterns.

FIG. 1 is a block diagram illustrating a multi-head attention module in a transformer in accordance with an example of the present disclosure. As illustrated in FIG. 1, the multi-head attention module 100 may be implemented through linear projections, SDDMMs, softmax, and concatenation. The multi-head attention module may be the multi-head self-attention module in an encoder layer i or a decoder layer j, or the multi-head cross-attention module in a decoder layer. In some examples, a layer norm layer will be provided following each linear layer.

Sparsity indicates the number of zero elements divided by the total number of elements in a matrix. Sparsity can be used in an attention mechanism or module of a transformer model to accelerate attention calculation. For example, starTransformer, LogSparse, and Longformer employ sparsity in transformer attention mechanism to address this issue. Sparse transformer attention mechanism allows each token to attend to only a subset of fixed positions in outputs of $QK^T$ using the equation below:

$$Q \times K^T \times M$$

where M indicates a sparsity mask, Q and K are respectively intermediate representations of an encoder input, an encoder output, or a decoder input. Thus, sparse transformer attention can be controlled by an attention mask $M=[0, 1]n \times n$, where $M_{i,j}=1$ indicates that token i can attend to token j, and 0 otherwise. Theoretically, computation and memory complexity of the sparse transformer can be reduced to $O(n \log(n))$, $O(n\sqrt{n})$, or even to $O(n)$. Even so, previous works mainly explore different sparsity patterns, i.e., the sparsity position during $QK^T$, in the sparse attention mechanism from the perspective of algorithm and dedicate little efforts to the hardware implementation and optimization. In fact, less algorithmic complexity does not necessarily mean faster inference if deployed in hardware devices including GPUs. This is particularly true for sparse attention-based transformer models since utilization of attention sparsity in computation generally requires dedicated hardware architecture design, limiting its wide adaption in real deployments. Therefore, it would be desirable to develop an acceleration methodology of sparse attention-based transformer on regular hardware devices such that the attention sparsity pattern can be taken full advantage of to provide a practical solution for the quadratic complexity problems of conventional transformers.

As illustrated in FIG. 1, a sparsity mask is used in the multi-head attention module 100. The multi-head attention module 100 may include a sparse attention module 110 which may include SDDMM kernels including a first SDDMM kernel 104 and a second SDDMM kernel 106, and a softmax kernel 105. Inputs of the multi-head attention module 100 may include a sparsity mask, a first matrix $Q_1$, a second matrix $K_1$, and a third matrix $V_1$. The first matrix $Q_1$, the second matrix $K_1$, and the third matrix $V_1$ may be respectively intermediate representations of an encoder input of a current encoder layer or a decoder input of a current decoder layer. In the multi-head cross-attention module of a decoder layer, the first matrix $Q_1$ and the second matrix $K_1$ are related to the encoder output generated by the encoder. In some examples, the transformer encompassing the multi-head attention module 100 shown in FIG. 1 may be implemented in hardware devices including GPUs, Application Specific Integrated Circuits (ASICs), Field Programmable Gate Arrays (FPGAs), etc.

Each kernel processes input data of the kernel when deployed on hardware devices, such as, the GPU. For example, as shown in FIG. 1, the first SDDMM kernel 104 processes all inputs loaded to the first SDDMM kernel 104 including the sparsity mask, the first matrix $Q_1$, and the second matrix $K_1$ when deployed on the GPU. The first SDDMM kernel 104 and the second SDDMM kernel 106 respectively process all inputs loaded to each SDDMM kernel 104, 106 when deployed on the GPU.

In some examples, a linear projection, i.e., a fully connected layer in a neural network, projects a first vector of a first dimension $d_1$ to a second vector of a second dimension $d_2$ by multiplying a projection matrix $[d_1, d_2]$. For example, as shown in FIG. 1, the first matrix $Q_1$ is projected by a linear projection kernel 101 to a first linearly projected matrix $Q_1'$ of dimension $d_k$. The second matrix $K_1$ is projected by a linear projection kernel 102 to a second linearly projected matrix $K_1'$ of dimension $d_k$. The third matrix $V_1$ is projected by a linear projection kernel 103 to a third linearly projected matrix $V_1'$ of dimension $d_v$.

In some examples, the first matrix $Q_1$ may include a set of queries patched together into a matrix, the second matrix $K_1$ may include a set of keys patched together into a matrix, and the third matrix $V_1$ may include a set of values patched together into a matrix. The sets of queries, keys, and values may be related to encoder layers or decoder layers. Rows of the first matrix $Q_1$, the second matrix $K_1$, and the third matrix $V_1$ may be respectively queries, keys, and values.

In some examples, the first matrix $Q_1$ and the second matrix $K_1$ are respectively linearly projected through the linear projection kernel 101 and the linear projection kernel 102, and the first linearly projected matrix $Q_1'$ and the second linearly projected matrix $K_1'$ are respectively obtained. After linear projection, the first and second linearly projected matrices $Q_1'$ and $K_1'$ are loaded into the first SDDMM kernel 104. In addition to $Q_1'$ and $K_1'$, the sparsity matrix is loaded into the first SDDMM kernel 104.

In some examples, the first and second linearly projected matrices $Q_1'$ and $K_1'$ loaded into the first SDDMM kernel 104 are respectively stored in the regular dense matrix format which keeps all the matrix elements including zeros and non-zeros, while the sparsity matrix that is loaded into the first SDDMM kernel 104 is stored in a compressed format.

The first SDDMM kernel 104 may generate a first output based on the first and second linearly projected matrices $Q_1'$ and $K_1'$, and the sparsity mask. A softmax kernel 105 in the sparse attention module 110 may scale and apply a softmax function over the first output and generate a second output. The second SDDMM kernel 106 may load the second output, the third linearly projected matrix $V_1'$, and the sparsity matrix and then generate an attention output for the sparse attention module 110.

Figure 2:
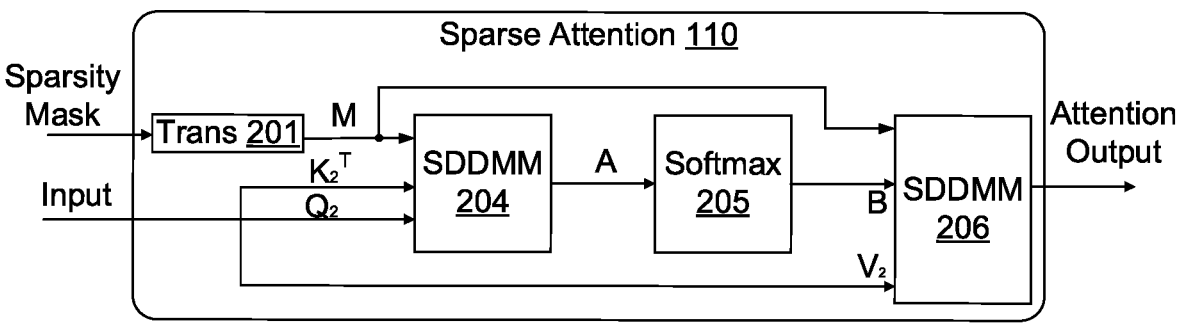
FIG. 2 is a block diagram illustrating a sparse attention module in a multi-head attention module in accordance with an example of the present disclosure.

In some examples, as illustrated in FIG. 2, a sparsity mask in the regular dense matrix format is transformed through a transformation kernel 201 to a transformed sparsity mask M and the transformed sparsity mask M is loaded into a first SDDMM kernel 204. FIG. 2 illustrates another example of the sparse attention module 110. The first SDDMM kernel 204 may be the same as the first SDDMM kernel 104. A first matrix $Q_2$ and a transpose of a second matrix $K_2$ are loaded into the first SDDMM kernel 204. The first matrix $Q_2$ and the second matrix $K_2$ may be the same as the first and second linearly projected matrices $Q_1'$ and $K_1'$ loaded into the first SDDMM kernel 104, as shown in FIG. 1.

In some examples, the first SDDMM kernel 204 may perform an operation as follows:

$$A = (Q_2 K_2^T)oM$$

where $Q_2$ represents the first matrix $Q_2$ that is stored in the regular dense matrix format, $$K_2^T$$

represents a transpose of the second matrix $K_2$ that is stored in the regular dense matrix format, M represents the transformed sparsity mask that is stored in the compressed format, A represents a first output of the first SDDMM kernel 204, and o denotes component-wise multiplication. Furthermore, the first output A of the first SDDMM kernel 204 is a sparse matrix that is stored in the compressed format. In some examples, the compressed format that the transformed sparsity mask M and the first output A are stored in is a CRS format. The CRS format puts subsequent non-zeros of matrix rows in contiguous memory locations.

The CRS format may create three vectors: entry, col, and row for a sparse matrix. For example, the sparse matrix may include n rows and n columns. The sparse matrix does not have to be include same number of rows and columns. The entry vector stores the values of the nonzero elements of a matrix. The col vector stores the column indices of the nonzero elements in the entry vector and entries are grouped by row. The row vector stores the locations in the col and the entry vectors of the first entry associated with each row, and the last entry of the row vector indicates where the first entry of row n+1 may go. The associated CRS format may store these vectors using three separate files, containing the entry, column, and row information separately, thus significantly saves storage.

For example, a sparse matrix K is defined as follows:

$$K = \begin{bmatrix} 10 & 0 & 0 & 0 & -2 \\ 3 & 9 & 0 & 0 & 0 \\ 0 & 7 & 8 & 7 & 0 \\ 3 & 0 & 8 & 7 & 5 \\ 0 & 8 & 0 & 9 & 13 \end{bmatrix}$$

The CRS format for this sparse matrix K is then specified by arrays {entry,col,row} as below:

| entry | 10 | −2 | 3 | 9 | 7 | 8 | 7 | 3 | 8 | 7 | 5 | 8 | 9 | 13 |
|-------|-----|-----|---|---|----|----|---|---|---|---|---|---|---|----|
| col | 0 | 4 | 0 | 1 | 1 | 2 | 3 | 0 | 2 | 3 | 4 | 1 | 3 | 4 |
| row | 0 | 2 | 4 | 7 | 11 | 14 | | | | | | | | |

Figure 3:
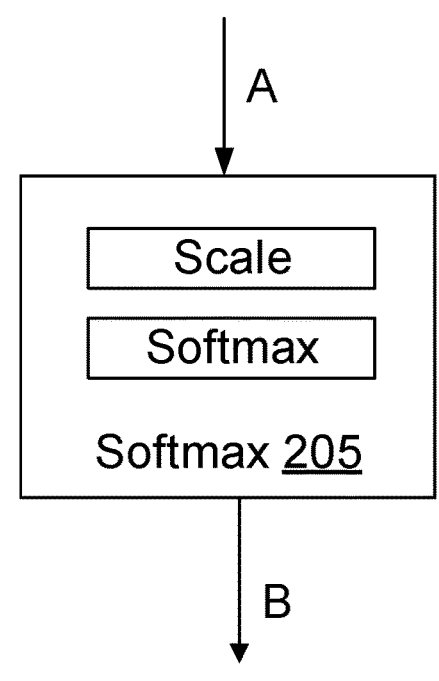
FIG. 3 is a block diagram illustrating a softmax kernel in a sparse attention module in accordance with an example of the present disclosure.

As illustrated in FIGS. 2-3, the first output A is directly loaded into a softmax kernel 205. The softmax kernel 205 may scale the first output A and apply a softmax function over the first output A, which is a sparse matrix, to generate a second output B. The second output B is in a regular dense matrix format. For example, the softmax kernel 205 may apply the softmax function over the first output A as follows:

$$B = \mathrm{softmax}\left(A/\sqrt{d_k}\right)$$

where $d_k$ indicates dimension of a query matrix or a key matrix, such as the first linearly projected matrix $Q_1'$, the second linearly projected matrix $K_1'$, as shown in FIG. 1.

The second output B is then loaded to another matrix multiplication kernel in the sparse attention module 110. The matrix multiplication kernel may load the second output B, the third matrix $V_2$ and the transformed sparsity mask M as illustrated in FIG. 2. In some examples, the third matrix $V_2$ may be linearly projected through a linear projection kernel 103 and generate a linearly projected third matrix $V_1$. The linearly projected third matrix $V_1'$ may be stored in the regular dense matrix format. The matrix multiplication kernel may perform a matrix multiplication over the second output B, the linearly projected third matrix $V_1'$, and the transformed sparsity mask M.

In some examples, the matrix multiplication kernel may be an SDDMM kernel as illustrated in FIGS. 1-2. As illustrated in FIG. 2, a second SDDMM kernel 206 loads the second output B, the third matrix $V_2$ and the transformed sparsity mask M, and applies an SDDMM as:

$$C = (BV_2)oM$$

where the second output B is a matrix stored in the regular dense matrix format, and denotes component-wise multiplication. The output C generated by the second SDDMM kernel 206 is an attention output of the sparse attention module 110.

Moreover, the output C is loaded to a concatenate kernel 107 and after the concatenate kernel 107 jointly concatenates attention outputs, a linear projection kernel 108 receives concatenated attention outputs and generates an output for the multi-head attention module 100, as shown in FIG. 1. In some examples, a layer norm may follow the linear projection kernel 108 and generate the output for the multi-head attention module 100. In some examples, a layer norm may follow each linear projection kernel 101, 102, or 103. A layer norm may normalize each feature of activations of a previous layer, such as the linear projection kernel 101, 102, 103, or 108, to zero mean and unit variance.

During the calculation of the first SDDMM kernel and the second SDDMM kernel, each thread fetches data or temporal results from storage or memory of the GPU on which the two SDDMM kernels directly runs, and these data or temporal results may be reused to speed up the calculation. The general method to optimize and accelerate the sparse transformer model for a CPU/GPU heterogeneous platform can achieve significant acceleration compared to traditional method when applied on GPUs. Such acceleration may also extend to other off-the-shelf hardware devices such as AI ASICs, FPGAs, or other chips.

Figure 4:
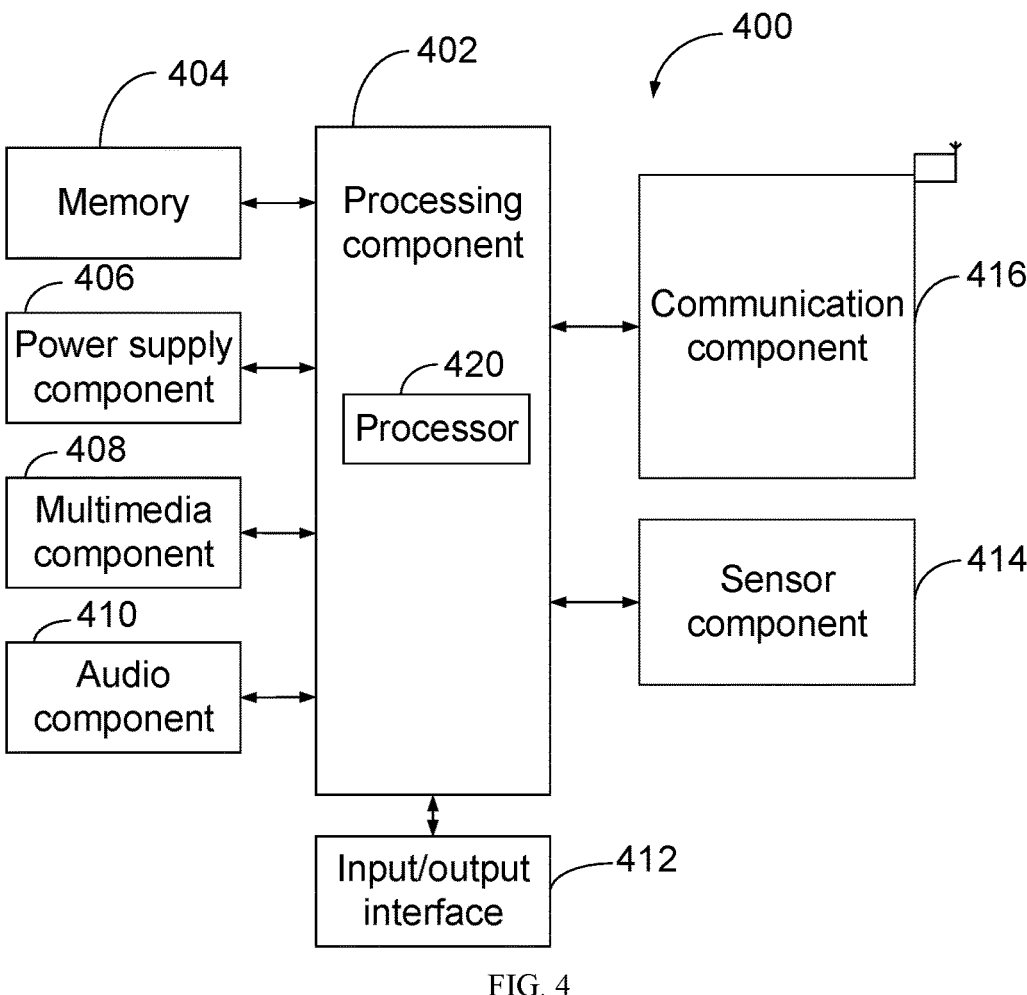
FIG. 4 is a block diagram illustrating an apparatus for accelerating a transformer with a sparse attention pattern in heterogeneous devices in accordance with an example of the present disclosure.

FIG. 4 is a block diagram illustrating an apparatus for accelerating a transformer with a sparse attention pattern in heterogeneous devices in accordance with an example of the present disclosure. The system 400 may be a terminal, such as a mobile phone, a tablet computer, a digital broadcast terminal, a tablet device, or a personal digital assistant.

As shown in FIG. 4, the system 400 may include one or more of the following components: a processing component 402, a memory 404, a power supply component 406, a multimedia component 408, an audio component 410, an input/output (I/O) interface 412, a sensor component 414, and a communication component 416.

The processing component 402 usually controls overall operations of the system 400, such as operations relating to display, a telephone call, data communication, a camera operation, and a recording operation. The processing component 402 may include one or more processors 420 for executing instructions to complete all or a part of steps of the above method. The processors 420 may include CPU, GPU, DSP, or other processors. Further, the processing component 402 may include one or more modules to facilitate interaction between the processing component 1002 and other components. For example, the processing component 1002 may include a multimedia module to facilitate the interaction between the multimedia component 408 and the processing component 402.

The memory 404 is configured to store different types of data to support operations of the system 400. Examples of such data include instructions, contact data, phonebook data, messages, pictures, videos, and so on for any application or method that operates on the system 400. The memory 404 may be implemented by any type of volatile or non-volatile storage devices or a combination thereof, and the memory 404 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 406 supplies power for different components of the system 400. The power supply component 406 may include a power supply management system, one or more power supplies, and other components associated with generating, managing, and distributing power for the system 400.

The multimedia component 408 includes a screen providing an output interface between the system 400 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 408 may include a front camera and/or a rear camera. When the system 400 is in an operation mode, such as a shooting mode or a video mode, the front camera and/or the rear camera may receive external multimedia data.

The audio component 410 is configured to output and/or input an audio signal. For example, the audio component 410 includes a microphone (MIC). When the system 400 is in an operating mode, such as a call mode, a recording mode and a voice recognition mode, the microphone is configured to receive an external audio signal. The received audio signal may be further stored in the memory 404 or sent via the communication component 416. In some examples, the audio component 410 further includes a speaker for outputting an audio signal.

The I/O interface 412 provides an interface between the processing component 402 and a peripheral interface module. The above peripheral interface module may be a keyboard, a click wheel, a button, or the like. These buttons may include but not limited to, a home button, a volume button, a start button, and a lock button.

The sensor component 414 includes one or more sensors for providing a state assessment in different aspects for the system 400. For example, the sensor component 414 may detect an on/off state of the system 400 and relative locations of components. For example, the components are a display and a keypad of the system 400. The sensor component 414 may also detect a position change of the system 400 or a component of the system 400, presence or absence of a contact of a user on the system 400, an orientation or acceleration/deceleration of the system 400, and a temperature change of system 400. The sensor component 414 may include a proximity sensor configured to detect presence of a nearby object without any physical touch. The sensor component 414 may further include an optical sensor, such as a CMOS or CCD image sensor used in an imaging application. In some examples, the sensor component 414 may further include an acceleration sensor, a gyroscope sensor, a magnetic sensor, a pressure sensor, or a temperature sensor.

The communication component 416 is configured to facilitate wired or wireless communication between the system 400 and other devices. The system 400 may access a wireless network based on a communication standard, such as WiFi, 4G, or a combination thereof. In an example, the communication component 416 receives a broadcast signal or broadcast related information from an external broadcast management system via a broadcast channel. In an example, the communication component 416 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 400 may be implemented by one or more of ASICs, Digital Signal Processors (DSPs), Digital Signal Processing Devices (DSPDs), Programmable Logic Devices (PLDs), FPGAs, controllers, microcontrollers, microprocessors, or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk etc.

FIG. 5 is a flowchart illustrating a method for accelerating a transformer with a sparse attention pattern in heterogeneous devices in accordance with an example of the present disclosure.

In step 502, a heterogeneous device including one or more GPUs loads a first matrix, a second matrix, and a transformed sparsity mask into a first SDDMM kernel in a sparse attention module in the transformer and generates a first output based on the first matrix, the second matrix, and the transformed sparsity mask by the first SDDMM kernel.

In some examples, before the step 502, the heterogeneous device may receive and pre-process the audio, image, or video data through one or more CPU in the heterogeneous device. Further, the audio, video, or image data may be pre-stored on storages in the heterogeneous device. The one or more CPUs may extract a plurality of audio, video, or image feature sequences from the audio, video, or image data. Such processing of the audio, video, or image data may be implemented on CPUs for serial multi-thread computation. Each of the plurality of audio, video, or image feature sequences may include a plurality of frames. For example, the number of frames may be 5, 10, 15, or more. After the pre-processing of the audio, video, or image data, following computation may be parallelly performed on the one or more GPUs.

In some examples, the first matrix may be the first matrix $Q_2$ shown in FIG. 2, the second matrix may be the second matrix $K_2$ shown in FIG. 2, the transformed sparsity mask may be the transformed sparsity mask M as shown in FIG. 2, the first SDDMM kernel may be the first SDDMM kernel 204 as shown in FIG. 2, and the first output may be the first output A as shown in FIG. 2.

In some examples, the transformed sparsity mask and the first output may be stored in a compressed format, such as the CRS format.

In some examples, the heterogeneous device may transform a sparsity mask in a regular dense matrix format to the transformed sparsity mask in the compressed format. In some examples, the sparsity mask may indicate the sparsity attention pattern.

In some examples, the first matrix, the second matrix, and the third matrix may be in a regular dense matrix format.

In step 504, the heterogeneous device generates a second output by a softmax kernel in the sparse attention module based on the first output.

In some examples, the second output may be the second output B and the softmax kernel may be the softmax kernel 205 as shown in FIGS. 2-3.

In some examples, the softmax kernel in the heterogeneous device may scale and apply a softmax function over the first output to generate the second output, where the first output is a sparse matrix and the second output is in the regular dense matrix format.

In step 506, the heterogeneous device loads the second output, a third matrix, and the transformed sparsity mask into a SDDMM kernel in the sparse attention module and generates an output of the sparse attention module. The first matrix, the second matrix, and the third matrix are related to an input to the sparse attention module.

In some examples, the third matrix may be the third matrix $V_2$ as shown in FIG. 2, and the first, the second, and the third matrices are respectively linearly projected by a first matrix $Q_1$, the second matrix $K_1$, and the third matrix $V_1$ as shown in FIG. 1.

In some examples, the matrix multiplication kernel may be an SDDMM kernel, such as the second SDDMM kernel 206 as shown in FIG. 2 and the output may be the attention output as shown in FIG. 2.

In some examples, there is provided a non-transitory computer readable storage medium 404, having instructions stored therein. When the instructions are executed by one or more processors 420, the instructions cause the processor to perform methods as illustrated in FIG. 5 and described above.

The present disclosure implements core sparse attention mechanism in a transformer model by leveraging sparse matrix multiplication from the perspective of algorithm. Specifically, the proposed sparse attention module is implemented through three stages including: (i) obtaining the first output A based on SDDMM; (ii) obtaining the second output B by applying the softmax operation over the first output A which is a sparse matrix; and (iii) obtaining the attention output C based on SDDMM. Specifically, the CSR format is used to store the sparse matrices involved in the three stage computation, i.e., the transformed sparsity matrix M, the first output matrix A, and the second output matrix B. The use of sparse matrix multiplication using CSR format and SDDMM achieves that: 1) sparse matrix multiplication can save memory and computation cost compared to the regular dense matrix multiplication, and 2) sparse attention based on sparse matrix multiplication can be implemented with a low complexity, e.g., $O(n \log(n))$, $O(n\sqrt{n})$, or even $O(n)$) by leveraging effective accelerating methodology when it is deployed in hardware, like GPU, which can benefit the transformer implementation and deployment.

As a result, the present disclosure proposes a complete sparse attention module in a transformer model, which includes both general sparse attention implementation based on sparse matrix multiplication and sparse attention acceleration in CPU/GPU heterogeneous devices.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for accelerating a transformer with a sparse attention pattern in heterogeneous devices, comprising:
  loading, by a heterogeneous device comprising one or more graphic processing units, a first matrix, a second matrix, and a transformed sparsity mask into a first sampled dense-dense matrix multiplication (SDDMM) kernel in a sparse attention module in the transformer and generating a first output based on the first matrix, the second matrix, and the transformed sparsity mask by the first SDDMM kernel;
  generating, by the heterogeneous device, a second output by a softmax kernel in the sparse attention module based on the first output; and
  loading, by the heterogeneous device, the second output, a third matrix, and the transformed sparsity mask into a matrix multiplication kernel in the sparse attention module and generating an output of the sparse attention module, wherein the matrix multiplication kernel is a second SDDMM kernel.

2. The method of claim 1, wherein the transformed sparsity mask and the first output are stored in a compressed format.

3. The method of claim 2, further comprising:
  transforming, by the heterogeneous device, a sparsity mask in a regular dense matrix format to the transformed sparsity mask in the compressed format, wherein the sparsity mask indicates the sparsity attention pattern.

4. The method of claim 1, wherein the first matrix, the second matrix, and the third matrix are in a regular dense matrix format.

5. The method of claim 2, wherein loading the second output, the third matrix, and the transformed sparsity mask into the matrix multiplication kernel in the sparse attention module comprises:
  loading the second output, the third matrix, and the transformed sparsity mask into the second SDDMM kernel in the sparse attention module to generate the output of the sparse attention module.

6. The method of claim 1, further comprising:
  scaling and applying, by the softmax kernel, a softmax function over the first output to generate the second output, wherein the first output is a sparse matrix.

7. An apparatus for accelerating a transformer with a sparse attention pattern in heterogeneous devices, comprising:
  one or more processors; and
  a memory configured to store instructions executable by the one or more processors,
  wherein the one or more processors, upon execution of the instructions, are configured to:
  load a first matrix, a second matrix, and a transformed sparsity mask into a first sampled dense-dense matrix multiplication (SDDMM) kernel in a sparse attention module in the transformer and generate a first output based on the first matrix, the second matrix, and the transformed sparsity mask by the first SDDMM kernel;
  generate a second output by a softmax kernel in the sparse attention module based on the first output; and
  load the second output, a third matrix, and the transformed sparsity mask into a matrix multiplication kernel in the sparse attention module and generate an output of the sparse attention module, wherein the matrix multiplication kernel is a second SDDMM kernel.

8. The apparatus of claim 7, wherein the transformed sparsity mask and the first output are stored in a compressed format.

9. The apparatus of claim 8, wherein the one or more processors are further configured to:
  transform a sparsity mask in a regular dense matrix format to the transformed sparsity mask in the compressed format, wherein the sparsity mask indicates the sparsity attention pattern.

10. The apparatus of claim 7, wherein the one or more processors are further configured to:
  wherein the first matrix, the second matrix, and the third matrix are in a regular dense matrix format.

11. The apparatus of claim 8, wherein the one or more processors are further configured to:
  load the second output, the third matrix, and the transformed sparsity mask into the second SDDMM kernel in the sparse attention module to generate the output of the sparse attention module.

12. The apparatus of claim 7, wherein the one or more processors are further configured to:
  scale and apply, by the softmax kernel, a softmax function over the first output to generate the second output, wherein the first output is a sparse matrix.

13. A non-transitory computer readable storage medium, comprising instructions stored therein, wherein, upon execution of the instructions by one or more processors, the instructions cause the one or more processors to perform acts comprising:
  loading a first matrix, a second matrix, and a transformed sparsity mask into a first sampled dense-dense matrix multiplication (SDDMM) kernel in a sparse attention module in a transformer in heterogeneous devices and generating a first output based on the first matrix, the second matrix, and the transformed sparsity mask by the SDDMM kernel;

generating a second output by a softmax kernel in the sparse attention module based on the first output; and loading the second output, a third matrix, and the transformed sparsity mask into a matrix multiplication kernel in the sparse attention module and generating an output of the sparse attention module, wherein the matrix multiplication kernel is a second SDDMM kernel.

14. The non-transitory computer readable storage medium of claim 13, wherein the transformed sparsity mask and the first output are stored in a compressed format.

15. The non-transitory computer readable storage medium of claim 14, wherein the one or more processors are caused to perform acts further comprising:

transforming, by the heterogeneous device, a sparsity mask in a regular dense matrix format to the transformed sparsity mask in the compressed format, wherein the sparsity mask indicates the sparsity attention pattern.

16. The non-transitory computer readable storage medium of claim 13, wherein the first matrix, the second matrix, and the third matrix are in a regular dense matrix format.

17. The non-transitory computer readable storage medium of claim 14, wherein the one or more processors are caused to perform acts further comprising:

loading the second output, the third matrix, and the transformed sparsity mask into the second SDDMM kernel in the sparse attention module to generate the output of the sparse attention module.

18. The non-transitory computer readable storage medium of claim 13, wherein the one or more processors are caused to perform acts further comprising:

scaling and applying, by the softmax kernel, a softmax function over the first output to generate the second output, wherein the first output is a sparse matrix.

* * * * *